United States Patent
Matsumoto et al.

(10) Patent No.: US 8,657,073 B2
(45) Date of Patent: Feb. 25, 2014

(54) POWER TRANSMISSION APPARATUS

(75) Inventors: Takayuki Matsumoto, Tochigi (JP); Satoshi Niimura, Tochigi (JP); Tomiaki Ochiai, Tochigi (JP); Koji Iizuka, Tochigi (JP); Akihiro Masubuchi, Tochigi (JP); Mitsuaki Kakuta, Tochigi (JP); Atsushi Kawano, Tochigi (JP); Masahiro Kasahara, Tochigi (JP)

(73) Assignee: GKN Driveline Torque Technology KK, Tochigi-shi (JP)

( * ) Notice: Subject to any disclaimer, the term of this patent is extended or adjusted under 35 U.S.C. 154(b) by 1037 days.

(21) Appl. No.: 12/321,510

(22) Filed: Jan. 22, 2009

(65) Prior Publication Data
US 2009/0186737 A1    Jul. 23, 2009

(30) Foreign Application Priority Data

Jan. 22, 2008 (JP) .................... 2008-012043

(51) Int. Cl.
*F16N 39/00* (2006.01)
*F01M 1/00* (2006.01)
*F01M 9/06* (2006.01)
*F16N 7/26* (2006.01)
*F16N 7/28* (2006.01)

(52) U.S. Cl.
USPC ........................... 184/11.1; 184/6.12

(58) Field of Classification Search
USPC ................................. 184/6.12, 11.1
See application file for complete search history.

(56) References Cited

U.S. PATENT DOCUMENTS

| 1,220,810 | A | * | 3/1917 | Alquist | 184/6.12 |
| 2,840,186 | A | * | 6/1958 | Nyland | 184/6.12 |
| 3,383,937 | A | * | 5/1968 | Toenne et al. | 74/467 |
| 3,529,698 | A | * | 9/1970 | Nelson | 184/6.12 |
| 3,618,711 | A | * | 11/1971 | Vollmer | 184/6.12 |
| 3,771,622 | A | * | 11/1973 | Hyakumura | 184/11.2 |
| 4,658,665 | A | * | 4/1987 | Strinzel et al. | 74/467 |
| 4,721,184 | A | * | 1/1988 | Sowards | 184/6.12 |
| 5,064,017 | A | * | 11/1991 | Kikuchi et al. | 180/248 |
| 5,161,644 | A | * | 11/1992 | Swenskowski et al. | 184/6.12 |
| 5,209,321 | A | * | 5/1993 | Sado | 180/248 |
| 5,351,782 | A | * | 10/1994 | Kameda | 180/297 |
| 7,513,172 | B2 | * | 4/2009 | Takahashi et al. | 74/467 |

FOREIGN PATENT DOCUMENTS

| JP | 62-045464 | 3/1987 |
| JP | 62-059130 | 3/1987 |
| JP | 9-216524 | 8/1997 |
| JP | 10-138775 | 5/1998 |

* cited by examiner

*Primary Examiner* — William A Rivera
*Assistant Examiner* — Henry Liu
(74) *Attorney, Agent, or Firm* — Jordan and Hamburg, LLP

(57) ABSTRACT

A power transmission apparatus is capable of easily passing lubricant toward a seal arranged between a higher shat and an opening of a case of the apparatus. The apparatus includes the higher shaft, i.e., a hollow connecting shaft that faces the outside of the transfer case through the opening of the transfer case. The oil seal is arranged between the hollow shaft and the opening of the transfer case. The hollow shaft meshes, through helical spur gears, with an intermediate transferring shaft that is positioned lower than the hollow shaft. A lubricant guide is arranged to receive lubricant splashed up by the ring gear and helical spur gear of the intermediate shaft and guide the received lubricant toward the oil seal and a ball bearing.

7 Claims, 13 Drawing Sheets

POWER TRANSMISSION APPARATUS

BACKGROUND OF THE INVENTION

1. Field of the Invention

The present invention relates to a power transmission apparatus of, for example, a vehicle.

2. Description of Related Art

An example of a power transmission apparatus is disclosed in Japanese Unexamined Patent Application Publication No. S62-59130.

The power transmission apparatus of this related art includes a case and three shafts rotatably supported in the case. When gears attached to the shafts rotate, the gears takes up lubricant in the case and the lubricant lubricates seals arranged between openings of the case and the shafts or bearings supporting the shafts.

Among the three shafts, an output shaft for rear wheels, for example, is positioned higher than the other shafts and faces the outside of the case through an opening of the case. This configuration has a problem that the lubricant will not sufficiently reach a seal arranged between the higher shaft and the opening of the case.

SUMMARY OF THE INVENTION

An object of the present invention is to provide a power transmission apparatus capable of properly supplying lubricant to a seal arranged between an opening of a case of the apparatus and a shaft that is positioned higher than the other shafts in the case and faces the outside of the case through the opening of the case.

In order to accomplish the object, an aspect of the present invention provides a power transmission apparatus having a case and three shafts, the shafts being rotatably supported in the case and being interlocked with one another through gears, one of the shafts being positioned higher than the other shafts, an end of the higher shaft facing the outside of the case through an opening of the case. The apparatus includes a seal configured to seal a gap between the higher shaft and the opening of the case and a lubricant guide configured to receive lubricant taken up by the gears of the lower shafts and guide the received lubricant toward the seal.

This aspect of the present invention smoothly lubricates the seal arranged between the higher shaft and the opening of the case.

DETAILED DESCRIPTION OF EMBODIMENTS

Power transmission apparatuses according to embodiments of the present invention capable of properly lubricating a seal arranged between a higher shaft and an opening of a case will be explained. The power transmission apparatus of each embodiment realizes proper lubrication of seals, bearings, and the like with the use of a lubricant guide that receives lubricant scooped by gears of a lower shaft and guides the received lubricant toward the seals and the like.

Figure 1:
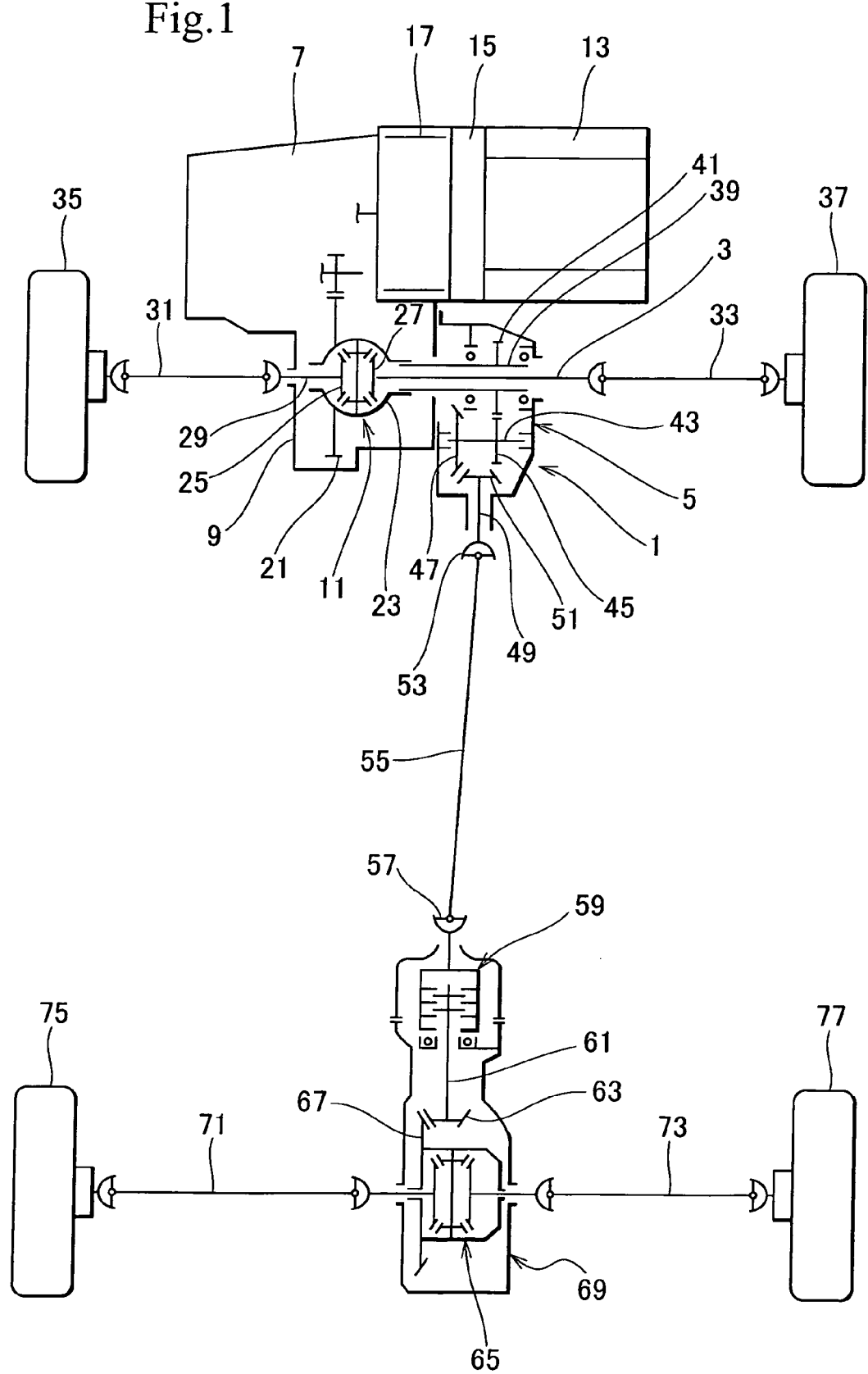
FIG. 1 is a schematic plan view showing a four-wheel-drive vehicle to which the present invention is applicable.

FIG. 1 is a schematic plan view showing a four-wheel-drive vehicle to which the present invention is applicable.

In the vehicle of FIG. 1, there is arranged a power transmission apparatus 1 according to a first embodiment of the present invention. The power transmission apparatus 1 passes therethrough an intermediate axle 3 for front wheels and arranged around the intermediate axle 3. A case 5 of the power transmission apparatus 1 is a transfer case and is attached to a bell housing 9 of a stationary transmission 7.

The bell housing 9 incorporates a front differential 11. The front differential 11 receives torque from an engine 13 through a main clutch 15, an electric motor 17, and the transmission 7. The torque is transferred through a ring gear 21 to a differential case 23.

The front differential 11 has left and right side gears 25 and 27 serving as output parts connected to intermediate axles 29 and 3. The intermediate axels 29 and 3 are connected to front-wheel axels 31 and 33, thereby connecting the front differential 11 to the front-wheel axels 31 and 33. The front-wheel axels 31 and 33 are connected to left and right front wheels 35 and 37.

The torque of the front differential 11 is transmitted through the intermediate axles 29 and 3 and front-wheel axles 31 and 33 to the front wheels 35 and 37.

The power transmission apparatus 1 distributes and transfers the torque of the front differential 11 to rear wheels. The intermediate axle 3 extends through the transfer case 5 of the power transmission apparatus 1.

The transfer case 5 includes a hollow connecting shaft 39. An end of the hollow shaft 39 is connected to the differential case 23 of the front differential 11. The hollow shaft 39 surrounds the intermediate axle 3 with a gap between them. The hollow shaft 39 has a helical spur gear 41 serving as a first gear that meshes with a helical spur gear 45 serving as a second gear arranged at an end of an intermediate transferring shaft 43.

Namely, the hollow shaft 39 and intermediate shaft 43 are the first and second shafts of the present invention that are rotatably supported in the transfer case 5, are arranged in parallel with each other, and are interlocked with each other through the helical spur gears 41 and 45 corresponding to parallel meshing gears.

The other end of the intermediate shaft 43 has a hypoid ring gear 47 serving as a third gear that meshes with a hypoid pinion gear 51 serving as a fourth gear attached to an output shaft 49 for rear wheels.

Namely, the output shaft 49 is the third shaft of the present invention that is rotatably supported in the transfer case 5, is arranged orthogonally to the intermediate shaft (second shaft) 43, and is interlocked with the intermediate shaft 43 through the orthogonally meshing ring gear 47 and pinion gear 51 corresponding to orthogonal meshing gears.

The output shaft 49 is connected through a universal joint 53 to a propeller shaft 55. The propeller shaft 55 is connected through a universal joint 57 and a 4-WD on-demand torque transmission coupling 59 to a drive pinion shaft 61. The drive pinion shaft 61 has a drive pinion gear 63 that meshes with a ring gear 67 of a rear differential 65.

The rear differential 65 is supported by a carrier case 69 and is connected through left and right rear-wheel axels 71 and 73 to left and right rear wheels 75 and 77.

The torque of the engine 13 is transmitted through the main clutch 15, electric motor 17, and transmission 7 to the ring gear 21 of the front differential 11. On the one hand, the torque is transmitted through the intermediate axles 29 and 3 and front-wheel axles 31 and 33 to the left and right front wheels 35 and 37, and on the other hand, the torque is transmitted through the differential case 23, hollow shaft 39, helical spur gears 41 and 45, intermediate shaft 43, ring gear 47, and pinion gear 51 to the output shaft 49.

From the output shaft 49, the torque is transmitted through the universal joint 53, propeller shaft 55, universal joint 57, torque transmission coupling 59, drive pinion shaft 61, and drive pinion gear 63 to the ring gear 67 of the rear differential 65. From the rear differential 65, the torque is transmitted through the left and right rear-wheel axles 71 and 73 to the left and right rear wheels 75 and 77.

As a result, the vehicle can run with the front and rear wheels 35, 37, 75, and 77 being in an on-demand four-wheel driving mode.

Figure 2:
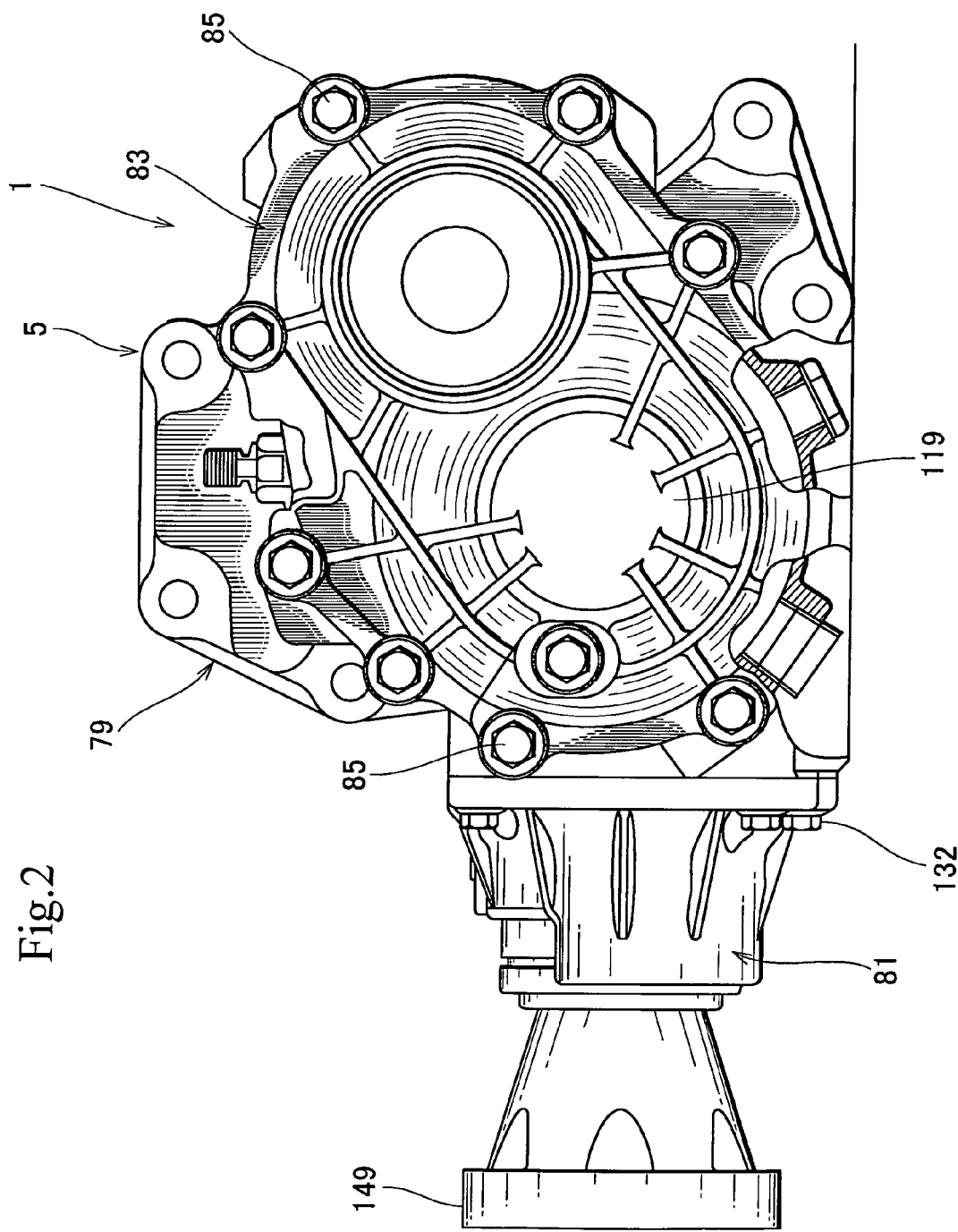
FIG. 2 is a side view showing a power transmission apparatus according to a first embodiment of the present invention.

The power transmission apparatus 1 according to the first embodiment of the present invention installed in the vehicle shown in FIG. 1 will be explained in detail. FIG. 2 is a side view showing the power transmission apparatus 1, FIG. 3 is a sectional view showing the power transmission apparatus 1 with a lubricant guide arranged in the apparatus, FIG. 4 is a sectional view taken along a line IV-IV of FIG. 3, and FIG. 5 is an internal view showing a case cover of the power transmission apparatus 1.

The power transmission apparatus 1 employs three shafts, i.e., the intermediate transferring shaft 43, the output shaft 49 for rear wheels, and the hollow connecting shaft 39 that is positioned higher than the other shafts 43 and 49.

Figure 3:
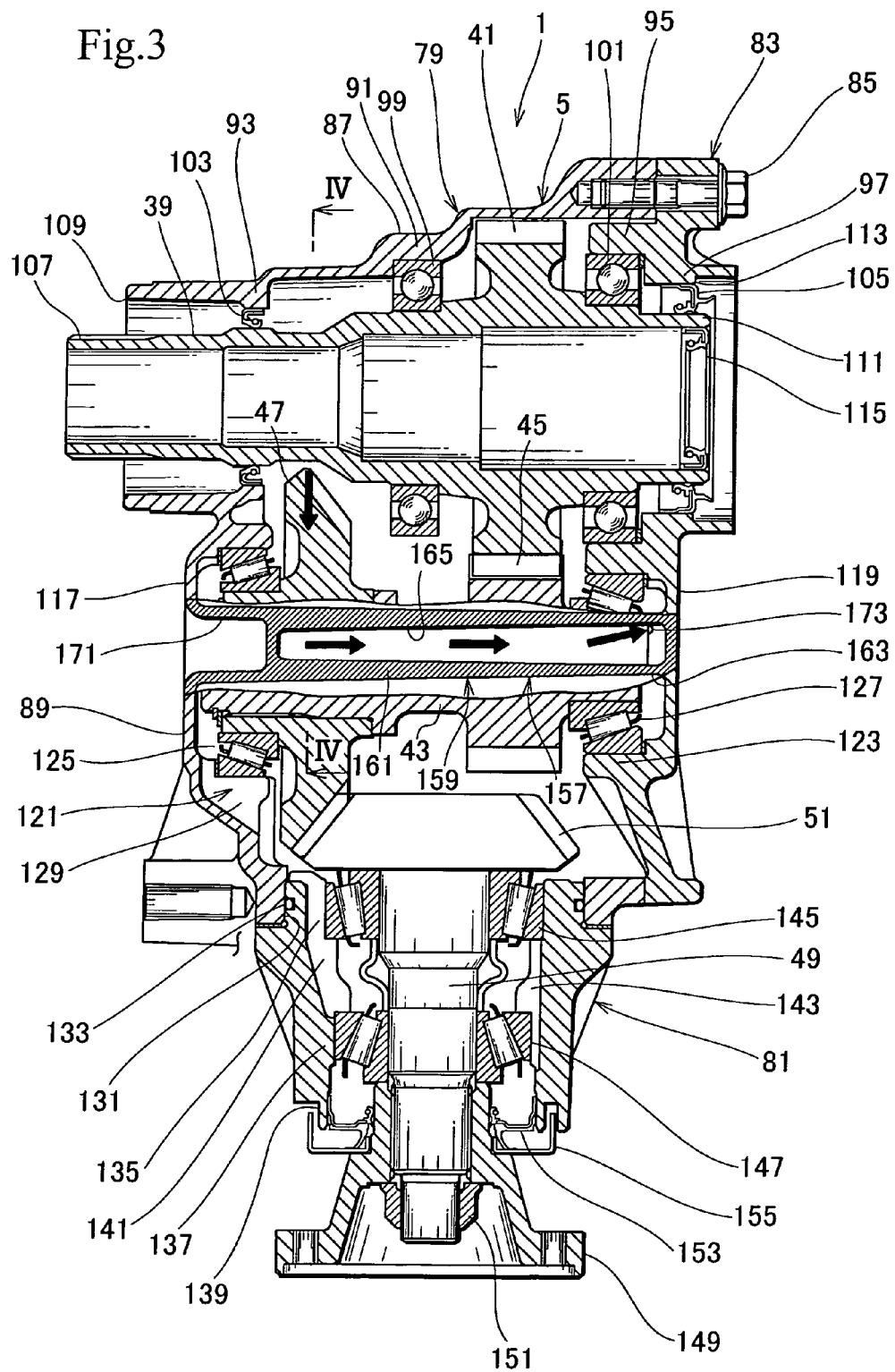
FIG. 3 is a sectional view showing the power transmission apparatus, in particular, a lubricant guide arranged in the apparatus, according to the first embodiment.
Figure 4:
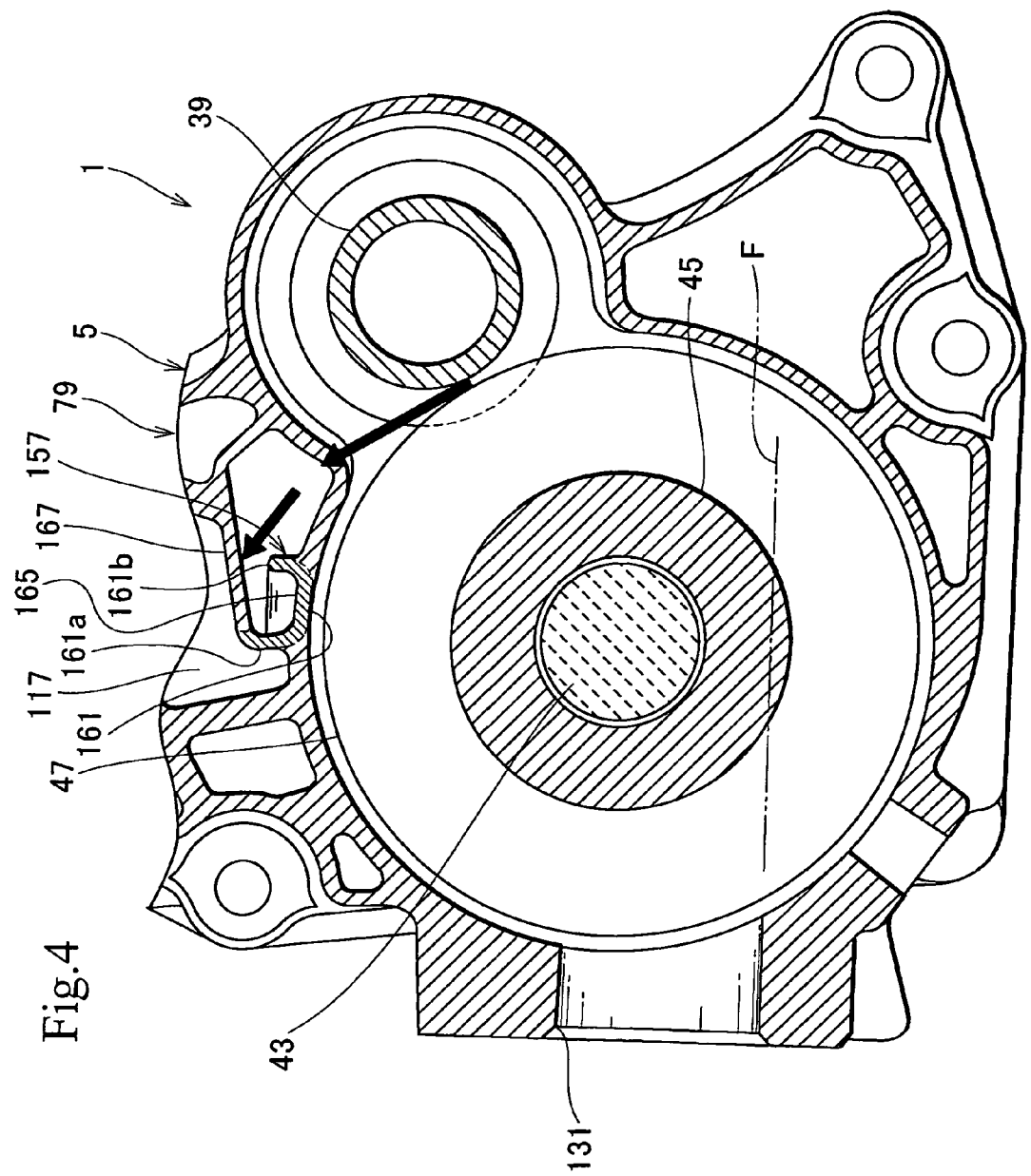
FIG. 4 is a sectional view taken along a line IV-IV of FIG. 3.
Figure 5:
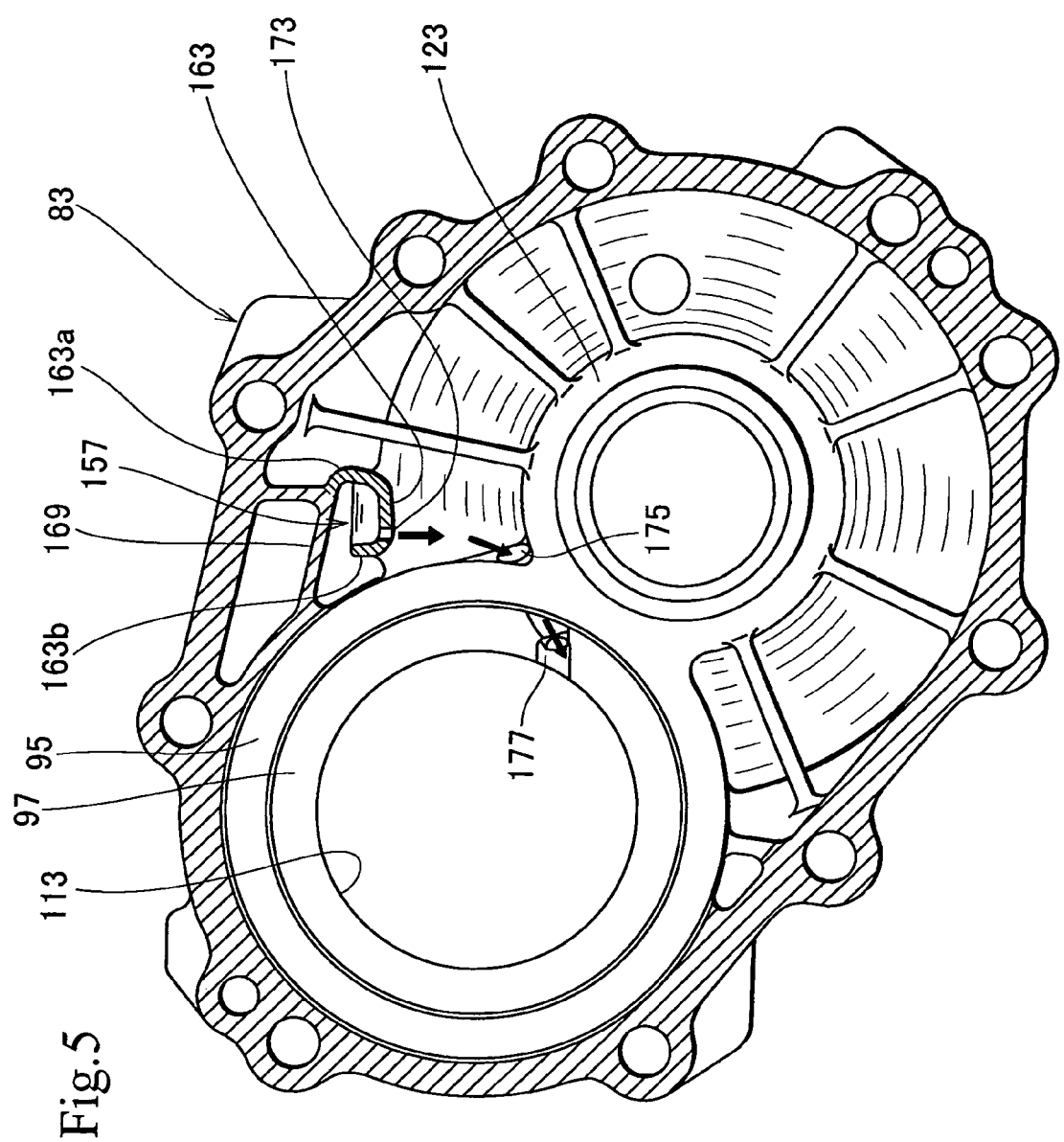
FIG. 5 is an internal view showing a case cover of the power transmission apparatus of the first embodiment.

As shown in FIGS. 2 to 4, the transfer case 5 includes a first case part 79, a second case part 81 and a case cover 83. The first case part 79 rotatably supports the hollow shaft 39 and intermediate shaft 43. The second case part 81 rotatably supports the output shaft 49. The case cover 83 is fixed to an end of the first case part 79 with bolts 85.

The first case part 79 has a first chamber 87 and a second chamber 89. The first chamber 87 accommodates the hollow shaft 39 and helical spur gear 41. The second chamber 89 accommodates the intermediate shaft 43, helical spur gear 45, and ring gear 47.

On a first side of the helical spur gear 41, the first chamber 87 has a bearing support 91 and a seal support 93. On a second side of the helical spur gear 41, the case cover 83 has a bearing support 95 and a seal support 97.

The bearing supports 91 and 95 support ball bearings 99 and 101 that rotatably support the hollow shaft 39 that is integral with the helical spur gear 41. The seal support 93 of the first chamber 87 and the seal support 97 of the case cover 83 support oil seals 103 and 105 that are closely in contact with an outer circumference of the hollow shaft 39. The oil seals 103 and 105 and the hollow shaft 39 slide relative to each other.

An outer circumference of a first end of the hollow shaft 39 is provided with a joint spline 107 that protrudes from an opening 109 formed at a first end of the first chamber 87 and joins with the differential case 23 through splines.

A second end of the hollow shaft 39 protrudes from the oil seal 105 and faces the outside of the power transmission apparatus 1 through an opening 113 formed at a second end of the first chamber 87. The seal support 97 is defined along an inner circumference of the opening 113.

In this way, the hollow shaft (first shaft) 39 is positioned higher than the intermediate shaft (second shaft) 43 and output shaft (third shaft) 49 and faces the outside of the power transmission apparatus 1 through the opening 113 of the transfer case 5. Between the hollow shaft (first shaft) 39 and the opening 113 of the transfer case 5, there is arranged the oil seal 105.

An inner circumference of the second end 111 of the hollow shaft 39 is provided with an oil seal 115 that is closely in contact with an outer circumference of the intermediate axle 3. The oil seal 115 and intermediate axle 3 are slidable relative to each other.

On the first end side of the intermediate shaft 43, the second chamber 89 has a closed wall 117. On the second end side of the intermediate shaft 43, the case cover 83 has a closed wall 119.

The closed wall 117 has a bearing support 121 and the closed wall 119 has a bearing support 123. The bearing supports 121 and 123 support tapered roller bearings 125 and 127 that rotatably support the ends of the intermediate shaft 43. The bearing support 121 has an oil path 129. The oil path 129 forms a passage between the inner face side of the closed wall 117 and the back side of the ring gear 47.

The second case part 81 supports the output shaft 49, is fitted to an opening 131 of the second chamber 89 of the first case part 79 and is fixed thereto with bolts 132. The opening 131 is oriented in a rear-wheel output direction.

An outer circumference of a first end of the second case part 81 is provided with an O-ring 133 that is closely in contact with an inner circumference of the opening 131.

The second case part 81 has bearing supports 135 and 137 and a seal support 139. Oil paths 141 and 143 are formed through the bearing supports 135 and 137. The oil paths 141 and 143 connect the inside of the second case part 81 to the inside of the first case part 79, so that lubricant splashed in the first case part 79 is guided into the second case part 81.

The bearing supports 135 and 137 support tapered roller bearings 145 and 147 that rotatably support the output shaft 49. An outer end of the output shaft 49 is coupled with a flange 149 through splines. The flange 149 is fixed to the output shaft 49 with a nut 151 that is fastened to the output shaft 49 so that the flange 149 may not come off.

The seal support 139 supports an oil seal 153, which is closely in contact with the flange 149 and is slidable relative to the flange 149. The flange 149 is provided with a dust cover 155 to cover an outer side of the oil seal 153.

A lubricant guide 157 according to the first embodiment of the present invention will be explained in detail. As shown in FIGS. 3 to 5, the lubricant guide 157 is integral with the transfer case 5. The lubricant guide 157 may be discretely made of resin, metal plate or the like, be formed in a given shape, and be fixed to the case 5.

The lubricant guide 157 receives lubricant splashed up by the ring gear 47 of the intermediate shaft 43 and guides the received lubricant toward the oil seal 105 and the like. The intermediate shaft 43 is positioned lower than the hollow shaft 39 that is interlocked with the intermediate shaft 43 through the gears 41 and 45.

The lubricant guide 157 has a channel 159 that extends above and in parallel with the intermediate shaft 43. Namely, the channel 159 extends from the closed wall 117 of the second chamber 89 to the closed wall 119 of the case cover 83 along an axial direction of the intermediate shaft 43. The channel 159 includes a channel part 161 on the second chamber 89 side and a channel part 163 on the case cover 83 side. Ends of the channel parts 161 and 163 are in contact with each other to form the channel 159. A channel may be optionally changed in shape according to the shape of the case to the extent that it secures a function as the lubricant guide. For example, a channel may include only a part such as the channel part 161 of the first case part 79 as one component of the case.

The channel part 161 has a passage 165 that extends from a position above the ring gear 47 to a position above the second end of the intermediate shaft 43. The width of the passage 165 gradually widens toward the channel part 163 that is located above the second end of the intermediate shaft 43. Also, the passage 165 is downwardly inclined toward the second end of the intermediate shaft 43 and toward the hollow shaft 39.

The channel part 161 has a side 161a that is integral with a rib 167 of the closed wall 117 of the second chamber 89. The channel part 163 has a side 163a that is integral with a rib 169 formed on an inner face of the case cover 83. The rib 169 is formed along the channel 159. The other sides 161b and 163b of the channel parts 161 and 163 are open so that lubricant scooped by the ring gear 47 is mainly received over the side 161b of the channel part 161 and is passed through the passage 165 of the channel 159.

In this way, the channel 159 of the lubricant guide 157 is inclined to receive lubricant taken up by the ring gear (orthogonal meshing gear) 47 and guide the received lubricant toward the helical spur gear (parallel meshing gear) 45.

Corresponding to the channel 159, the closed wall 117 of the second chamber 89 has a recess 171 as shown in FIG. 3, to reduce the weight. In spite of the presence of the recess 171, an end of the passage 165 is located on an outer circumferential side of the ring gear 47, so that the channel 159 may properly receive lubricant splashed up by the ring gear 47.

The channel part 163 has a communication recess 173. When the channel parts 161 and 163 are abutted to each other, the recess 173 forms a hole to pass lubricant from the passage 165.

Under the recess 173, there is a narrow space where the bearing supports 95 and 123 meet. In this narrow space, an end of a passage hole 175 is open. The passage hole 175 is downwardly formed through the bearing support 95 toward the seal support 97 and is connected to a groove 177 that is formed on an end face of the seal support 97 on the bearing support 95 side.

Lubricant is filled in the transfer case 5 to a lubricant surface F having a level under the rotational center of the intermediate shaft 43 so as to immerse the teeth of the helical spur gear 45.

When the ring gear 47 rotates to transmit torque, the ring gear 47 splashes the lubricant upwardly as indicated with arrows shown in FIGS. 3 and 4. The splashed lubricant is received by the channel 159 in which the lubricant flows along the passage 165 as indicated with arrows shown in FIG. 3 due to the inclination of the passage 165. The lubricant is then guided downwardly through the recess 173.

The lubricant from the recess 173 is collected in the narrow space between the bearing supports 95 and 123 and is passed through the hole 175 and groove 177 to a space between the ball bearing 101 and the oil seal 105.

The lubricant thus guided sufficiently lubricates the oil seal 105 and ball bearing 101.

After lubricating the oil seal 105 and ball bearing 101, the lubricant flows to return to a lubricant pool on the ring gear 47 side.

The helical spur gear 45 also splashes up the lubricant. The splashed lubricant is received by the channel 159 like the lubricant splashed up by the ring gear 47, to contribute to lubricating the oil seal 105 and ball bearing 101. The helical spur gear 45 is smaller in diameter than the ring gear 47, and therefore, an amount of the lubricant scooped by the helical spur gear 45 into the channel 159 is smaller than that by the ring gear 47.

The lubricant splashed up by the ring gear 47 and helical spur gear 45 also reaches and lubricates the ball bearing 99, oil seal 103, tapered roller bearings 125 and 127, and the like.

The lubricant splashed up by the ring gear 47 also flows through the oil paths 141 and 143 and lubricates the tapered roller bearings 145 and 147.

In this way, the power transmission apparatus 1 according to the first embodiment has the transfer case 5 and the three shafts 39, 43, and 49 that are rotatably supported in the case 5 and are interlocked with one another through the gears 41, 45, 47, and 51. Among the shafts, the hollow shaft 39 is positioned higher than the other shafts 43 and 49. An end of the higher shaft, i.e., the hollow shaft 39 faces the outside of the case 5 through the opening 113 of the case 5. The oil seal 105 is arranged between the hollow shaft 39 and the opening 113 of the case 5. The lubricant guide 157 is arranged to receive lubricant splashed by the ring gear 47 and helical spur gear 45 and guide the received lubricant toward the oil seal 105 and ball bearing 101.

The first embodiment can properly lubricate the oil seal 105 and ball bearing 101 arranged between the hollow shaft 39 and the opening 113 of the transfer case 5.

The oil seal 105 is spaced away from the ring gear 47, and the ball bearing 99, the helical spur gears 41 and 45 and the like arranged axially between the ring gear 47 and the ball bearing 101 prevent the lubricant splashed by the ring gear 47 from spattering and flowing to the oil seal 105. Due to this, if a conventional configuration is adopted, lubricant hardly reaches the oil seal 105, and therefore, the oil seal 105 is insufficiently lubricated. To cope with this, the first embodiment employs a combination of the channel 159, recess 173, hole 175, groove 177 and the like as the lubricant guide 157, to guide lubricant and properly lubricate the oil seal 105.

The intermediate shaft 43 and output shaft 49 are positioned lower than the hollow shaft 39. Even with this arrangement, the first embodiment can properly lubricate the oil seal 105 and the like. As a result, the first embodiment allows a large space to be secured above the output shaft 49 of the transfer case 5 as shown in FIG. 2. With this large space, the power transmission apparatus 1 can easily be installed in a vehicle without interfering with other parts such as a steering rack.

The lubricant guide 157 according to the first embodiment has the channel 159 that extends above and along the intermediate shaft 43.

This configuration can smoothly guide lubricant splashed up by the ring gear 47 toward the case cover 83.

According to the first embodiment, the lubricant guide 157 is integral with the transfer case 5.

This configuration eliminates a need of special parts for the lubricant guide 157, to make parts maintenance and assembly easier.

According to the first embodiment, the channel 159 of the lubricant guide 157 is inclined to receive lubricant taken up by the ring gear 47 and pass the received lubricant toward the helical spur gear 45.

This configuration easily guides the lubricant toward the oil seal 105 that is located on the helical spur gear 45 side with respect to the ring gear 47.

Figure 6:
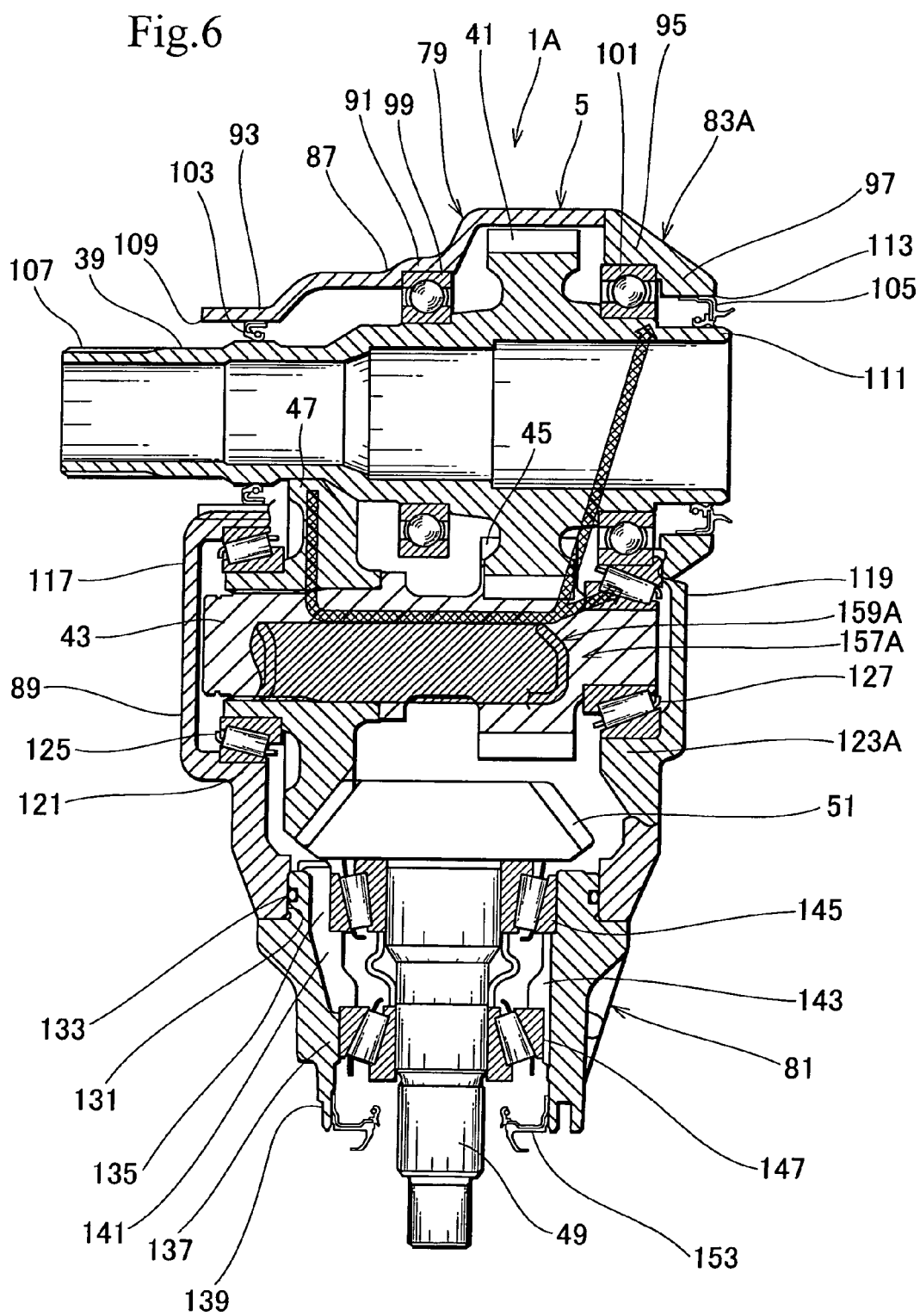
FIG. 6 is a sectional view showing a power transmission apparatus according to a second embodiment of the present invention.
Figure 7:
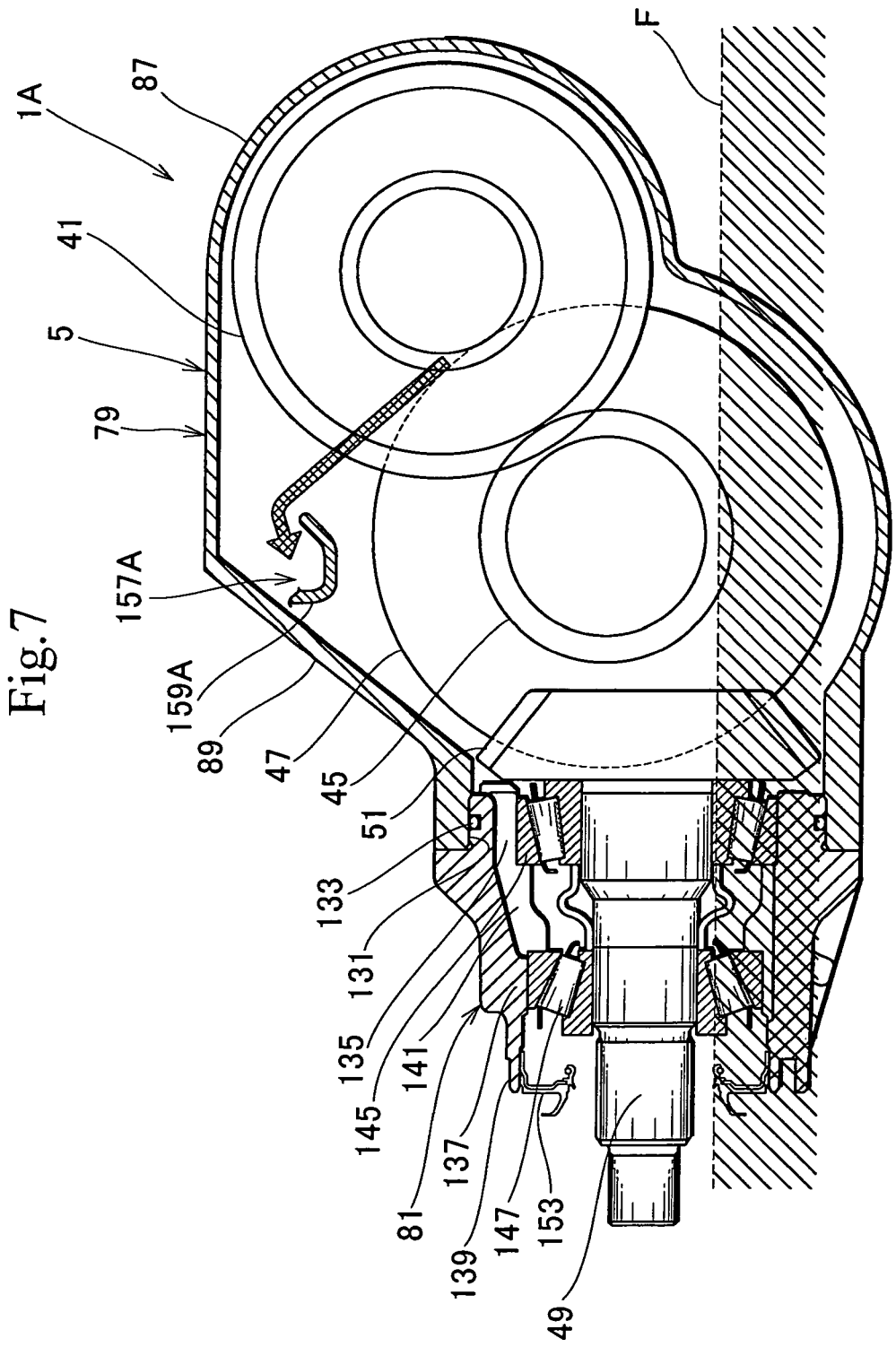
FIG. 7 is a vertical section showing a side of the power transmission apparatus of the second embodiment.
Figure 8:
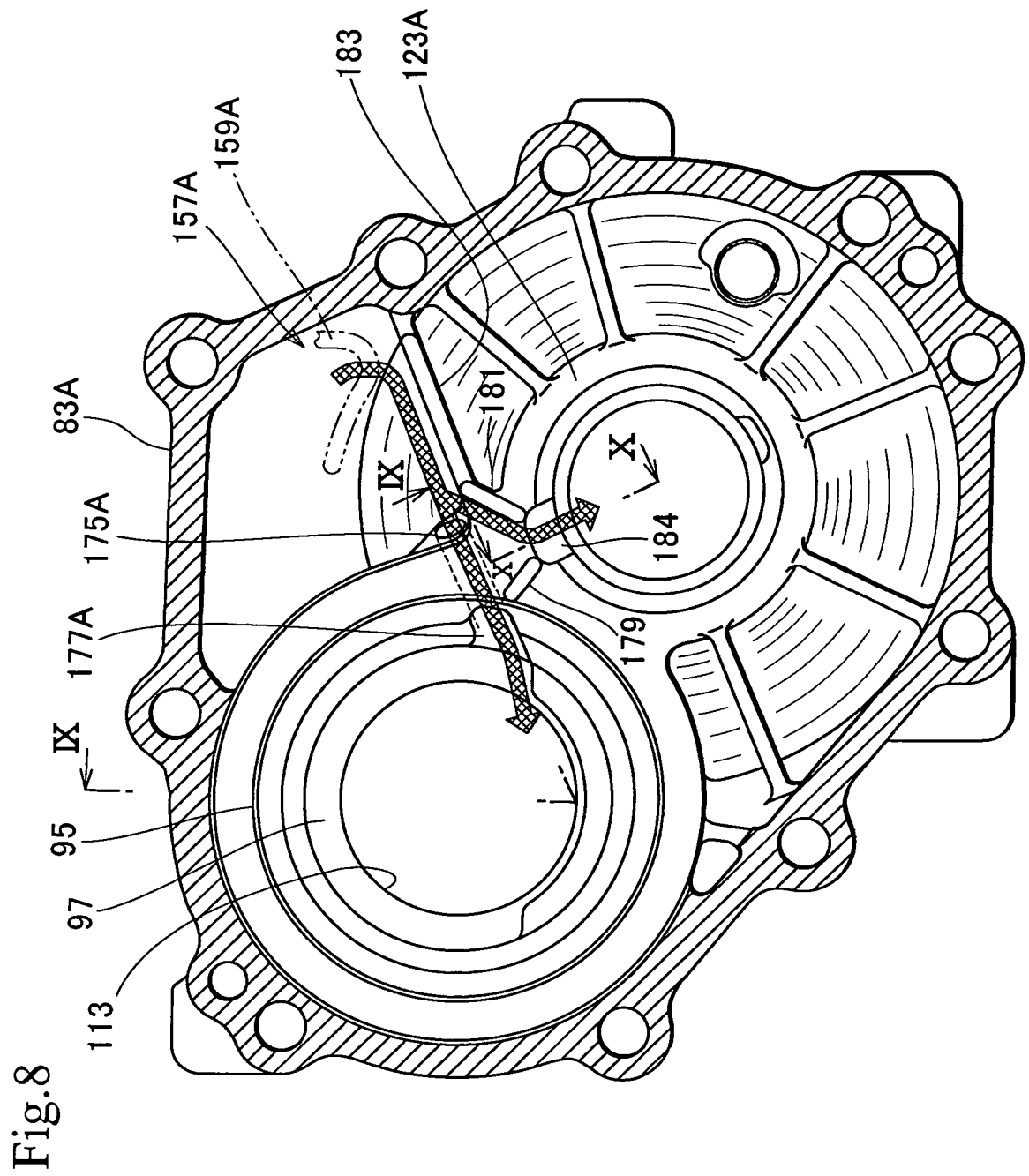
FIG. 8 is an internal view showing a case cover of the power transmission apparatus of the second embodiment.
Figure 9:
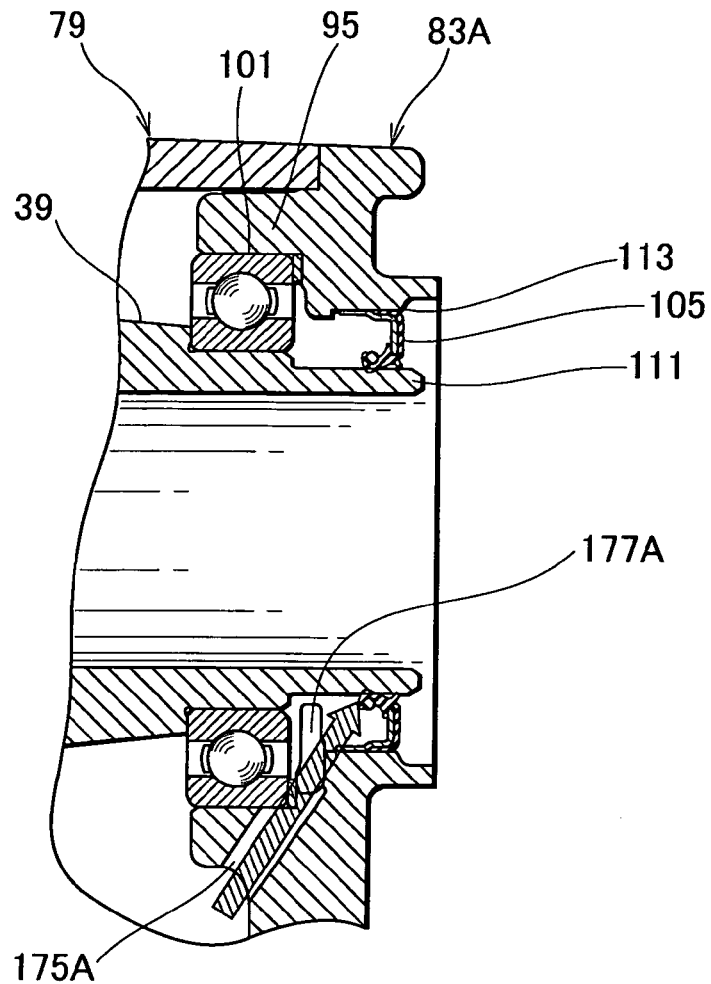
FIG. 9 is a sectional view taken along a line IX-IX of FIG. 8.
Figure 10:
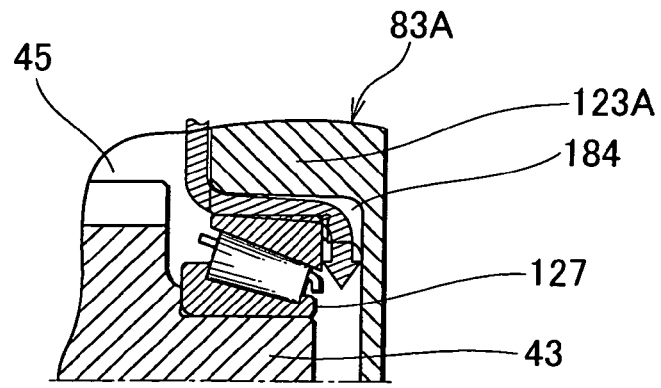
FIG. 10 is a sectional view taken along a line X-X of FIG. 8.

A power transmission apparatus according to a second embodiment of the present invention will be explained with reference to FIGS. 6 to 10 in which FIG. 6 is a sectional view showing the power transmission apparatus, FIG. 7 is a vertical section showing a side of the power transmission apparatus, FIG. 8 is an internal view showing a case cover of the power transmission apparatus, FIG. 9 is a sectional view taken along a line IX-IX of FIG. 8, and FIG. 10 is a sectional view taken along a line X-X of FIG. 8. FIG. 6 corresponds to FIG. 3. In these drawings, the parts corresponding to those of the first embodiment are represented with the same reference marks or the same reference marks plus "A."

In FIGS. 6 and 7, the power transmission apparatus 1A of the second embodiment has a lubricant guide 157A. The lubricant guide 157A has a channel 159A that is present only in a second chamber 89. An end of the channel 159A is open above a helical spur gear 45.

In FIGS. 8, 9, and 10, a case cover 83A according to the second embodiment has a passage hole 175A, a groove 177A, and passage ribs 179 and 181. The ribs 179 and 181 form a part of the lubricant guide 157A and are oriented toward a bearing support 123A. Under the open end of the channel 159A, an inclined rib 183 is formed on the case cover 83A. A lower end of the rib 183 is connected to the passage rib 181.

The bearing support 123A has a passage groove 184 to guide lubricant from the ribs 179 and 181 toward the back side of a tapered roller bearing 127.

According to the second embodiment, a ring gear 47 takes up lubricant from a lubricant surface F as indicated with arrows shown in FIGS. 6 and 7. The lubricant is received by the channel 159A inclined so as to gradually deepen toward the helical spur gear 45 and is passed onto the rib 183 from the open end of the channel 159A above the helical spur gear 45.

The lubricant moving along the rib 183 passes, on the one hand, through the hole 175A and groove 177A toward a space between a ball bearing 101 and an oil seal 105 as shown in FIG. 9. This surely lubricates the oil seal 105 and ball bearing 101 like the first embodiment.

The lubricant moving along the rib 183 flows, on the other hand, between the ribs 179 and 181 and toward the back side of the tapered roller bearing 127 as shown in FIG. 10. This sufficiently lubricates the tapered roller bearing 127.

The second embodiment can satisfy lubricating performance even if it involves the structure having the ball bearing 99, the helical spur gears 41 and 45 and the like arranged axially between the ring gear 47, and the ball bearing 101 and oil seal 105 to block the lubricant splashed by the ring gear 47.

Figure 11:
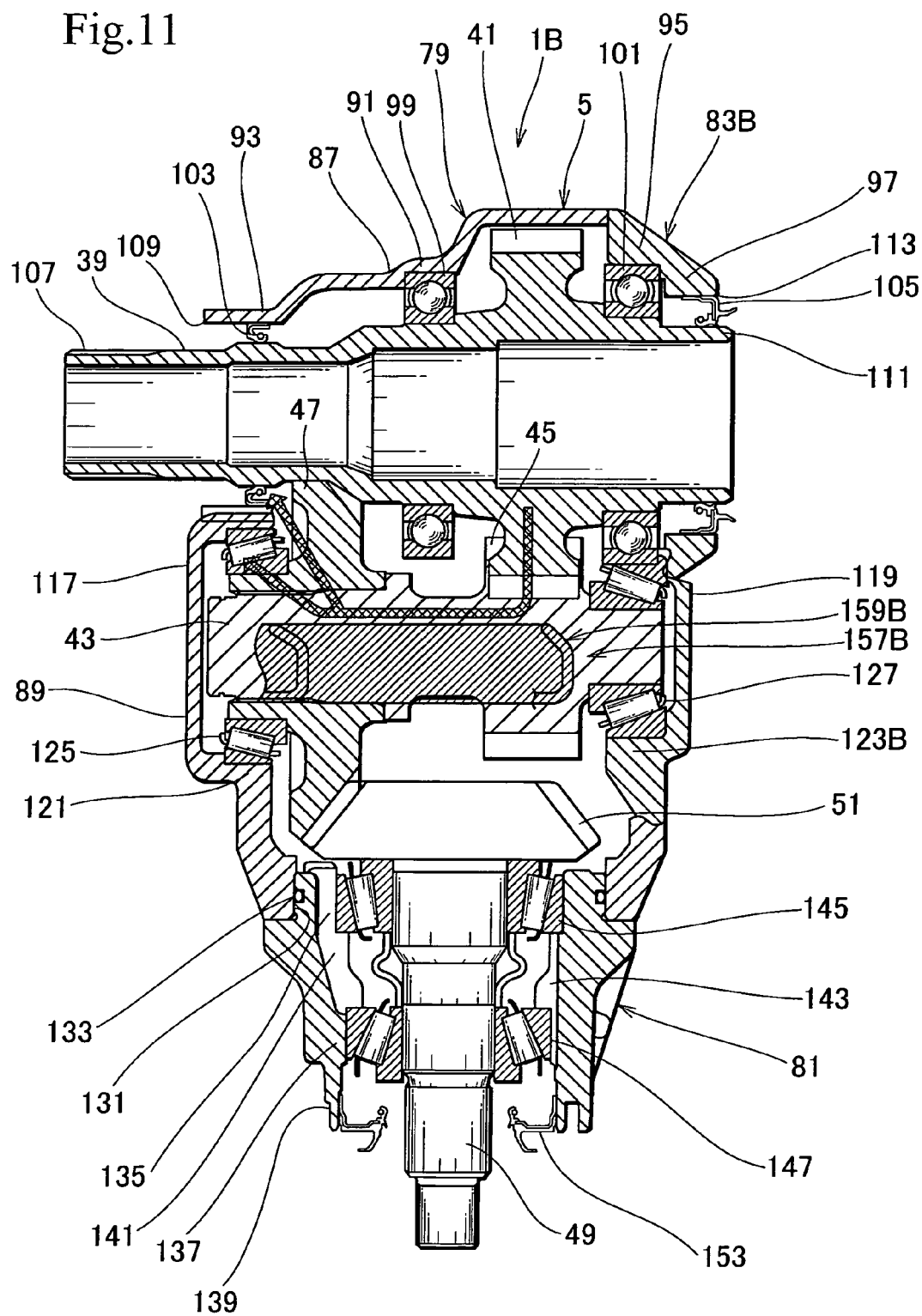
FIG. 11 is a sectional view showing a power transmission apparatus according to a third embodiment of the present invention.
Figure 12:
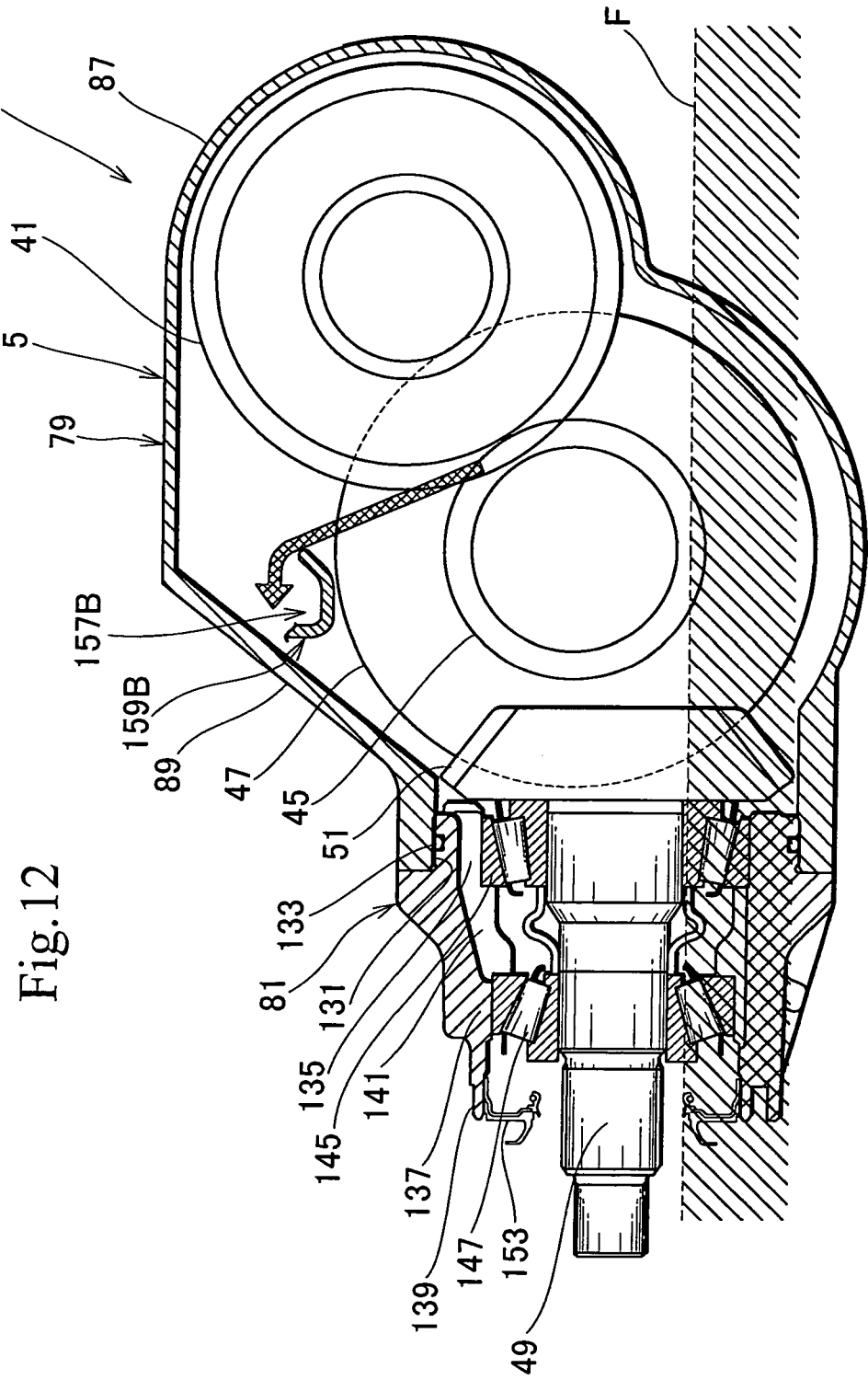
FIG. 12 is a vertical section showing a side of the power transmission apparatus of the third embodiment.

A power transmission apparatus according to a third embodiment of the present invention will be explained with reference to FIGS. 11 and 12 in which FIG. 11 is a sectional view showing the power transmission apparatus and FIG. 12 is a vertical section showing a side of the power transmission apparatus. FIG. 11 corresponds to FIG. 6 and FIG. 12 corresponds to FIG. 7. In these drawings, the parts corresponding to those of the second embodiment are represented with the same reference marks or the same reference marks plus "B" instead of "A" and repetitive explanations are omitted.

In FIGS. 11 and 12, the power transmission apparatus 1B according to the third embodiment has a lubricant guide 157B. The lubricant guide 157B has a channel 159B that is present only in a second chamber 89. The channel 159B is inclined so as to gradually deepen toward the ring gear 47 of the intermediate shaft 43 as the second shaft. An end of the channel 159B is open above a ring gear 47. The channel 159B of the lubricant guide 157B is inclined to receive lubricant splashed by a helical spur gear (parallel meshing gear) 45 and pass the received lubricant toward the ring gear (orthogonal meshing gear) 47.

According to the third embodiment, the helical spur gear 45 scoops lubricant as indicated with arrows shown in FIGS. 11 and 12. The lubricant is received by the channel 159B and is passed through the open end of the channel 159B above the ring gear 47 toward a tapered roller bearing 125 and an oil seal 103.

To guide lubricant, the third embodiment may have, like the second embodiment, ribs on an inner wall of a first case part 79 and passage holes and grooves on a bearing support 121.

Figure 13:
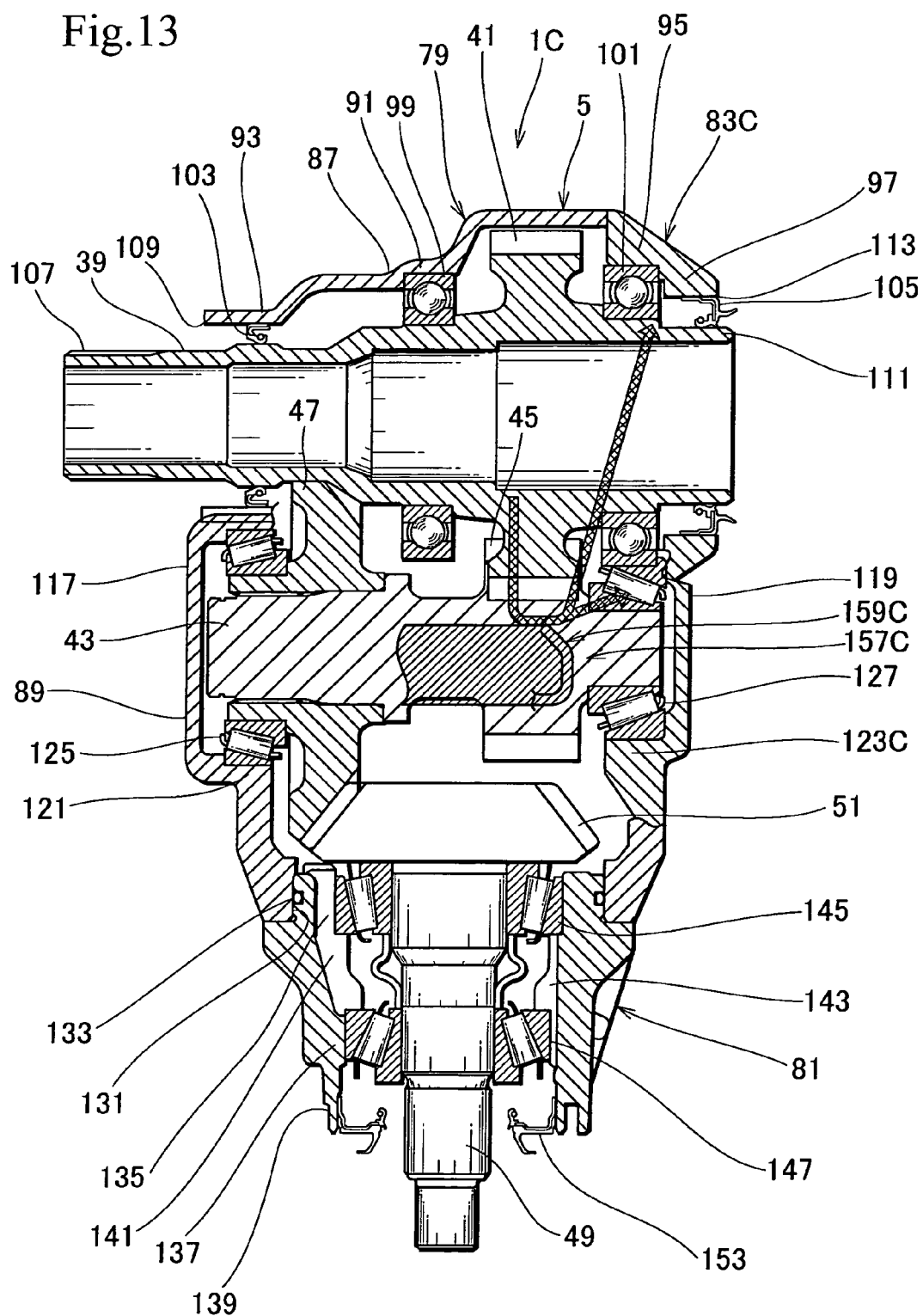
FIG. 13 is a sectional view showing a power transmission apparatus according to a fourth embodiment of the present invention.
Figure 14:
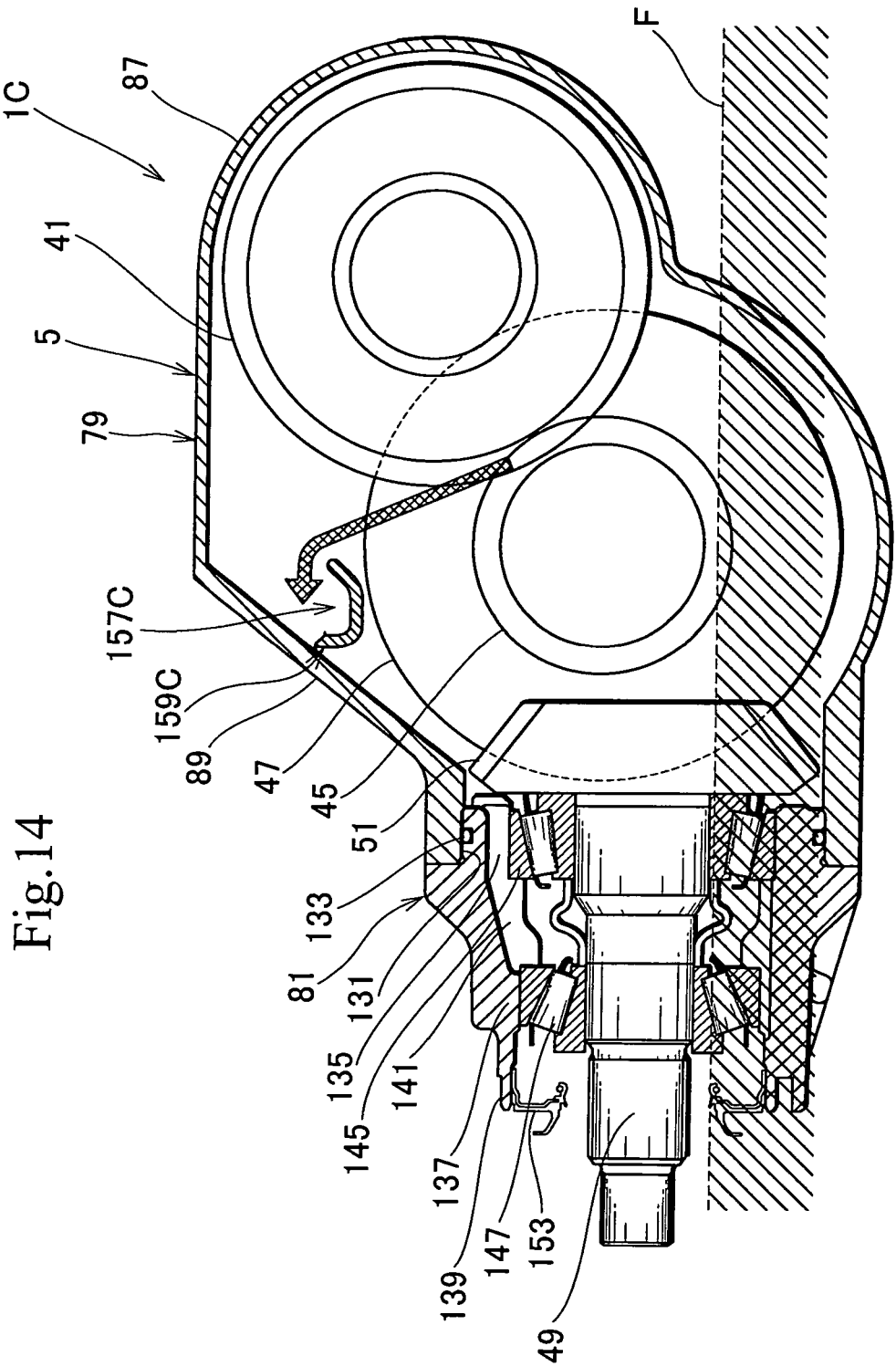
FIG. 14 is a vertical section showing a side of the power transmission apparatus of the fourth embodiment.

A power transmission apparatus according to a fourth embodiment of the present invention will be explained with reference to FIGS. 13 and 14 in which FIG. 13 is a sectional view showing the power transmission apparatus and FIG. 14 is a vertical section showing a side of the power transmission apparatus. FIG. 13 corresponds to FIG. 6 and FIG. 14 corresponds to FIG. 14. In these drawings, the parts corresponding to those of the second embodiment are represented with the same reference marks or the same reference marks plus "C" instead of "A" and repetitive explanations are omitted.

In FIGS. 13 and 14, the power transmission apparatus 1C according to the fourth embodiment has a lubricant guide 157C. The lubricant guide 157C has a channel 159C that is present only in a second chamber 89. An end of the channel 159C is open above a helical spur gear 45.

A case cover 83C of the fourth embodiment has parts corresponding to the passage hole 175A, passage groove 177A, passage ribs 179 and 181, and passage groove 184 of the second embodiment shown in FIGS. 8, 9, and 10.

According to the fourth embodiment, the helical spur gear 45 takes up lubricant as indicated with arrows shown in FIGS. 13 and 14. The lubricant is received by the channel 159C and is passed through the open end of the channel 159C above the helical spur gear 45 onto the ribs.

Consequently, the fourth embodiment can properly lubricate an oil seal 105, a ball bearing 101, and a tapered roller bearing 127, like the second embodiment.

What is claimed is:

1. A power transmission apparatus comprising:
    three shafts being rotatably supported in a case and being interlocked with one another through gears;
    one of the shafts being positioned higher than the other shafts;
    opposite ends of the higher shaft each facing the outside of the case through an opening of the case;
    respective seals configured to seal gaps between the higher shaft and openings of the case, respectively;
    a lubricant guide configured to receive lubricant splashed up by the gears of the lower shafts and guide the received lubricant toward the one of the respective seals and not toward another of the respective seals;

one of the lower shafts having the gears that are arranged in parallel and apart from each other in an axial direction of said one of the lower shafts, one of the gears of said one of the lower shafts meshing with the gear of the higher shaft and the other of the gears of said one of the lower shafts meshing with the gear of another one of the lower shafts;

the lubricant guide having a channel longitudinally extending along said one of the lower shafts so that the lubricant guide receives lubricant splashed by at least any one of the gears of said one of the lower shafts and guides the received lubricant toward said one of the seals;

said one of the seals lubricated by the guided lubricant;

the other of the seals lubricated by lubricant splashed by at least any one of the gears of said one of the lower shafts;

the case including a first case part and a case cover, the first case part being supported on a stationary side to define a chamber, the higher shaft being accommodated within the chamber, and the case cover being fixed to an end of the first case part so that the first case part and the case cover rotatably support the higher shaft that is accommodated within the chamber, the case cover having the opening through which the end of the higher shaft faces the outside of the case;

the chamber having a form accommodating the higher shaft, the gear of the higher shaft, said one of the lower shafts, and the gears arranged in parallel on said one of the lower shafts; and the channel being integrally connected to the first case part and longitudinally extending within the chamber toward the case cover.

2. A power transmission apparatus comprising:

first and second shafts that are rotatably supported in a case, are arranged in parallel with each other, and are interlocked with each other through parallel meshing gears;

a third shaft that is rotatably supported in the case, is arranged orthogonally to the second shaft, and is interlocked with the second shaft through orthogonal meshing gears, the first shaft being positioned higher than the second and third shafts and having opposite ends each facing the outside of the case through an opening of the case;

seals configured to seal gaps between the first shaft and openings of the case, respectively;

a lubricant guide configured to receive lubricant splashed up by any one of the parallel and orthogonal meshing gears attached to the second shaft and guide the received lubricant toward one of the seals;

the second shaft having the parallel meshing gear and the orthogonal meshing gear that are arranged in parallel and apart from each other in an axial direction of the second shaft;

the lubricant guide having a channel longitudinally extending along the second shaft so that the lubricant guide receives lubricant splashed by at least any one of the parallel meshing gear and the orthogonal meshing gear of the second shaft and guides the received lubricant toward said one of the seals;

said one of the seals lubricated by the guided lubricant; and the other of the seals being lubricated by lubricant splashed by at least any one of the parallel meshing gear and the orthogonal meshing gear of the second shaft; the case including a first case part and a case cover, the first case part being supported on a stationary side to define a chamber, the first shaft being accommodated within a chamber, and the case cover being fixed to an end of the first case part so that the first case part and the case cover rotatably support the first shaft that is accommodated within the chamber, the case cover having the opening through which the end of the first shaft faces the outside of the case;

the chamber having a form accommodating the first shaft, the gear of the first shaft, the second shaft, and the parallel meshing gear and the orthogonal meshing gear arranged in parallel on the second shaft; and the channel being integrally connected to the first case part and longitudinally extending within the chamber toward the case cover.

3. The power transmission apparatus of claim 2, wherein:
the lubricant guide has a channel that extends above and along the second shaft.

4. The power transmission apparatus of claim 2, wherein:
the lubricant guide is integral with the case.

5. The power transmission apparatus of claim 2, wherein:
the lubricant guide is slanted so as to receive lubricant splashed up by the orthogonal meshing gears and pass the received lubricant toward the parallel meshing gears.

6. The power transmission apparatus of claim 2, wherein:
the lubricant guide is slanted so as to receive lubricant splashed up by the orthogonal meshing gears and pass the received lubricant in one of directions toward and away from the orthogonal meshing gears.

7. A power transmission apparatus that distributes and transfers torque from a front differential to rear wheels of a four wheel drive vehicle, the front differential transferring torque to the power transmission and to from wheels of the four wheel drive vehicle, the front differential transferring torque to at least one of the front wheels via an axle, the power transmission comprising:

first and second shafts situated in their entirety in a common case, rotatably supported in the case, arranged in parallel with each other, and interlocked with each other through parallel meshing gears;

a third shaft situated entirely in the common case, rotatably supported in the case, arranged orthogonally to the second shaft, and interlocked with the second shaft through orthogonal meshing gears, wherein the first shaft is positioned higher than the second and third shafts and has opposite ends each facing an outside of the case through respective openings of the case, said openings adapted for receiving said axle to pass through the case;

respective seals configured to seal gaps between the first shaft and said respective case openings; and a lubricant guide having a channel longitudinally extending along the second shaft that collects lubricant splashed onto the lubricant guide and guides the collected lubricant toward one of said respective seals and not toward another of said respective seals;

wherein one of said parallel meshing gears and one of said orthogonal meshing gears coupled to the second shaft are arranged in parallel and apart from each other in an axial direction of the second shaft;

wherein said one parallel meshing gear and said one orthogonal meshing gear splash lubricant onto the lubricant guide and onto said another of said respective seals;

wherein the case includes a first case part and a case cover, the first case part being supported on a stationary side to define a chamber, the first shaft being accommodated within the chamber, and the case cover being fixed to an end of the first case part so that the first case part and the case cover rotatably support the first shaft that is accommodated within the chamber, the case cover having the openings through which the ends of the first shaft face the outside of the case;

the chamber having a form accommodating the first shaft, the gear of the first shaft, the second shaft, and the parallel meshing gear and the orthogonal meshing gear arranged in parallel on the second shaft; and the channel being integrally connected to the first case part and longitudinally extending within the chamber toward the case cover.

* * * * *